United States Patent
Parker et al.

(10) Patent No.: US 7,027,701 B2
(45) Date of Patent: Apr. 11, 2006

(54) OPTICAL WAVEGUIDE STRUCTURE

(75) Inventors: Greg Parker, Hampshire (GB); Martin Charlton, Southampton (GB); Majd Zoorob, Southampton (GB)

(73) Assignee: Mesophotonics Limited, Southampton (GB)

( * ) Notice: Subject to any disclaimer, the term of this patent is extended or adjusted under 35 U.S.C. 154(b) by 27 days.

(21) Appl. No.: 10/701,181

(22) Filed: Nov. 5, 2003

(65) Prior Publication Data

US 2004/0146257 A1 Jul. 29, 2004

Related U.S. Application Data

(63) Continuation-in-part of application No. 10/287,825, filed on Nov. 5, 2002, now abandoned.

(51) Int. Cl.
*G02B 6/10* (2006.01)
(52) U.S. Cl. ........................ 385/129; 385/123
(58) Field of Classification Search ........ 385/129–132, 385/123, 125–127, 141, 142, 144
See application file for complete search history.

(56) References Cited

U.S. PATENT DOCUMENTS

| | | |
|---|---|---|
| 5,526,449 A | 6/1996 | Meade et al. |
| 5,961,924 A | 10/1999 | Reichert et al. |
| 6,075,915 A | 6/2000 | Koops et al. |
| 6,134,369 A | 10/2000 | Kurosawa |
| 6,542,682 B1 | 4/2003 | Cotteverte et al. |
| 6,560,006 B1 | 5/2003 | Sigalas et al. |
| 6,631,236 B1 | 10/2003 | Yamada |
| 2001/0033409 A1 | 10/2001 | Takada |
| 2002/0150366 A1 | 10/2002 | Loncar et al. |
| 2004/0062505 A1 | 4/2004 | Sugitatsu et al. |

*Primary Examiner*—Sung Pak
(74) *Attorney, Agent, or Firm*—Nixon & Vanderhye P.C.

(57) ABSTRACT

An optical waveguide structure according to the invention comprises a core layer having a first refractive index $n_{core}$, an array of sub-regions within the core having a second refractive index $n_{rods}$, the array of sub-regions giving rise to a photonic band structure within the core layer, and a cladding layer adjacent to the core layer having a refractive index $n_{cladding}$, wherein: $n_{core} > n_{rods}[\exists] \geq n_{cladding}$ and $n_{core} - n_{rods} > 0.1$. The structure of the present invention is less lossy than prior waveguide structures having photonic band structure regions. The out of plane divergence of light in the sub-regions is reduced as compared with air holes which are typically used in photonic crystal structures. As a result more light is coupled back into the core at the sub-region/core interface. Coupling of light into the buffer layer is also reduced. Furthermore, there are added advantages over the prior art associated with the fabrication of these structures.

36 Claims, 7 Drawing Sheets

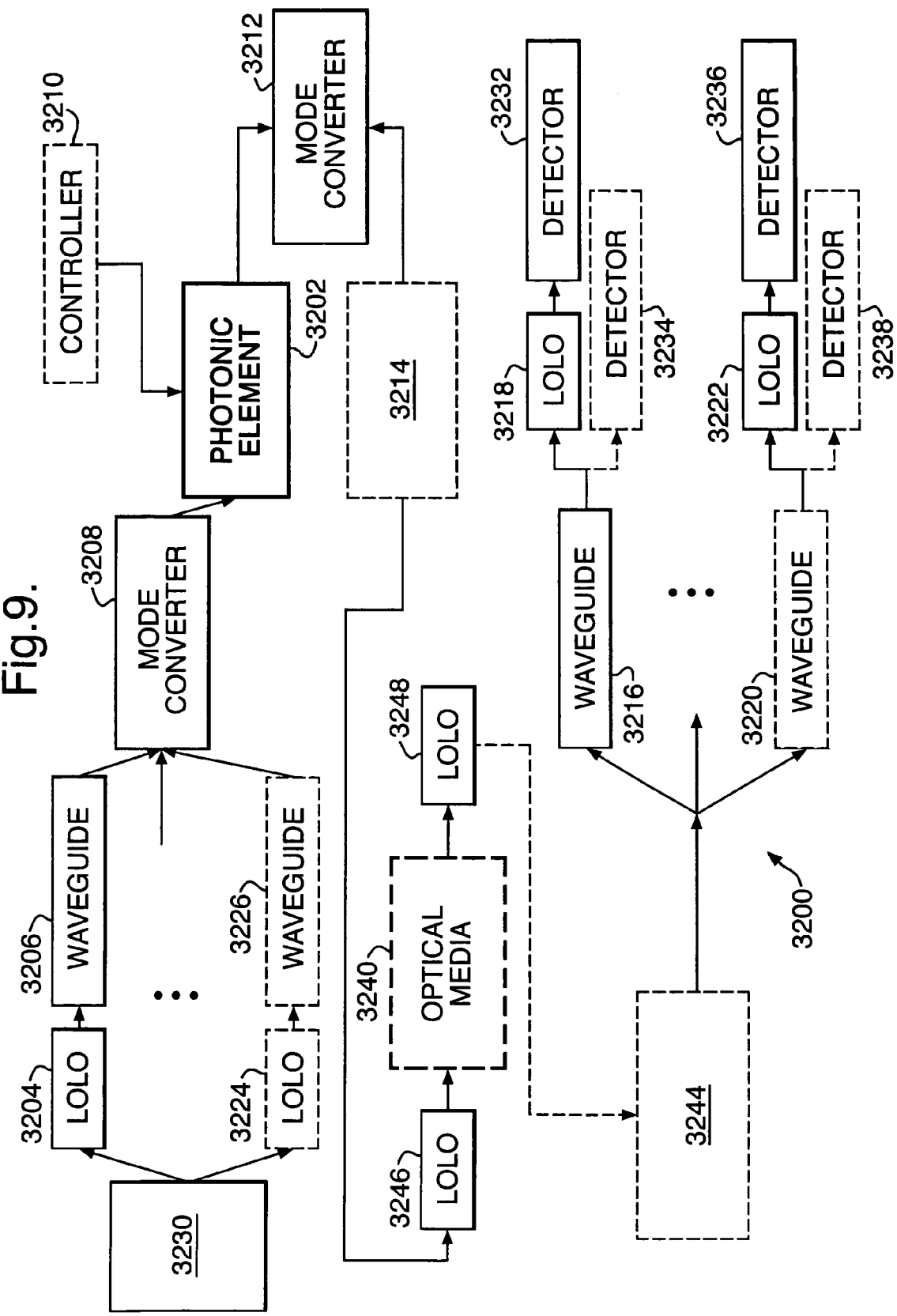

OPTICAL WAVEGUIDE STRUCTURE

This application is a continuation-in-part of application Ser. No. 10/287,825, filed Nov. 5, 2002 now abandoned.

FIELD OF THE INVENTION

The present invention relates to the field of optical waveguides and optical devices incorporating optical waveguides.

BACKGROUND TO THE INVENTION

It is increasingly recognised that integrated optical circuits have a number of advantages over electrical circuits. However, it has been difficult to produce integrated optical circuits which are comparably small, primarily due to the difficulty in producing waveguides which can include tight bends without large signal losses. It has also been difficult to produce integrated optical circuits including signal processing devices based on photonic band structures which can be easily coupled to current optical fibres, owing to a difference in the refractive index of the material used for optical fibres and those materials typically used for integrated optical devices, whilst still maintaining compact sizes.

Photonic crystals comprising a lattice of air holes formed in a core material, typically silicon or silicon nitride, have been fabricated, which exhibit a photonic band structure and typically a bandgap. Alternatively, a lattice of dielectric rods in air can be used. By not including some holes or rods in the lattice a line defect waveguide can be formed. Confinement of light within the waveguide is provided by using light within the photonic bandgap wavelength range. However, it has been found that devices of this type suffer from large losses, mainly due to the escape of light from the waveguide in a vertical direction.

Similarly, optical devices using this type structure for signal processing, such as filtering, suffer from large losses. This limits their usefulness.

SUMMARY OF THE INVENTION

According to a first aspect of the present invention, an optical waveguide structure comprises a core layer having a first refractive index $n_{core}$, an array of sub-regions within the core having a second refractive index $n_{rods}$, the array of sub-regions extending longitudinally along the waveguide and giving rise to a photonic band structure experienced by an optical mode travelling through the waveguide structure, and a cladding layer adjacent to the core layer having a refractive index $n_{cladding}$, wherein:

$n_{core} > n_{rods} \geq n_{cladding}$ and $n_{core} - n_{rods} > 0.1$

Preferably, the array of sub-regions gives rise to a photonic bandgap.

As is well known in the field of photonic crystals, in order to give rise to an appreciable band structure an absolute refractive index contrast of greater than 0.1 must be present between the main body of material and the sub-regions, which are typically holes. Indeed, typically, high refractive index such as silicon (n=4) have been used with a lattice of air holes (n=1) to provide a complete photonic bandgap. Accordingly, written grating structures, such as Bragg gratings, which have a refractive index contrast of less than 0.1 cannot be considered to be photonic crystals. Written grating structures do not interact with light in the same way as photonic crystals and so cannot be used to achieve the same functionality. Written structures only interact with the evanescent field of optical signals which gives rise to much weaker interaction.

The optical waveguide structure may be a planar structure. In this case, the waveguide guide structure preferably further includes a buffer layer having a refractive index $n_{buffer}$, wherein the core layer is positioned between the buffer layer and the cladding layer and wherein:

$n_{core} > n_{rods} \geq n_{buffer}$.

Alternatively, the waveguide structure may be an optical fibre structure, wherein the cladding layer surrounds the core layer.

The present invention provides advantages over conventional photonic crystal devices which include an array of rods in air or an array of air holes formed in a core layer. In these conventional structures there is a large amount of loss for optical signals passing through them, especially out of the plane of propagation. The structure of the present invention is less lossy than prior waveguide structures having photonic bandstructure regions. The out of plane divergence of light in the sub-regions is reduced as compared with air holes which are typically used in photonic crystal structures. As a result more light is coupled back into the core at the sub-region/core interface. In the planar case, coupling of light into the buffer layer is also reduced. Furthermore, there are added advantages over the prior art associated with the fabrication of these structures.

The refractive index contrast between the core and the sub-regions affects the nature of the band structure. For some applications, such as filtering and dispersion compensation the difference in refractive index can be extremely small i.e. a difference in the third decimal place of the refractive index. However, other applications such as 90° bends in waveguides require a bandgap which overlaps in different propagation directions. This requires a much larger refractive index contrast. Preferably, the core layer has a refractive index between 1.4 and 4. Preferably, the sub-regions have a refractive index between 1.3 and 1.6. Preferably, the cladding has a refractive index between 1.3 and 1.6. In the planar case, preferably the buffer layer has a refractive index-between 1.3 and 1.6.

Preferably, the sub-regions are formed from silicon oxynitride. Preferably, the core layer is formed from silicon nitride, doped silica, tantalum pentoxide or doped tantalum pentoxide. The cladding layer is preferably formed from silicon dioxide. In the planar case the buffer layer is preferably also formed from silicon dioxide.

The sub-regions may extend through the cladding layer as well as the core layer and partially or fully into the buffer layer. Alternatively, the cladding layer may include sub-regions corresponding to the sub-regions in the core layer having a refractive index which is greater than or equal to the refractive index of the cladding layer but which is less than or equal to the refractive index of the sub-regions in the core. Furthermore, in the planar case, the buffer layer may include sub-regions corresponding to the sub-regions in the core layer having a refractive index which is greater than or equal to the refractive index of the buffer layer but which is less than or equal to the refractive index of the sub-regions in the core.

The present invention is applicable to waveguides connecting integrated optical circuits as well as to individual optical devices which are used in integrated optical circuits. Any device incorporating waveguide bends in a glassy core layer can be improved by use of the present invention. Such devices include Arrayed Waveguide Gratings (AWGs), Mach Zehnder interferometers, directional couplers, dispersion compensators, splitters/multiplexers, polarisation compensators, optical switches, optical delay elements and filters.

Preferably, the core layer includes a lateral waveguiding region having no sub-regions. Preferably, the waveguiding region includes a waveguide bend.

According to a second aspect of the invention, a method of manufacturing a optical waveguide structure comprises the steps of:

providing a core layer having a first refractive index $n_{core}$;

providing an array of sub-regions within the core having a second refractive index $n_{rods}$, the array of sub-regions giving rise to a photonic band structure experienced by an optical mode travelling through the waveguide structure; and providing a cladding layer adjacent to the core layer having a refractive index $n_{cladding}$; wherein:

$$n_{core} > n_{rods} \geq n_{cladding}.$$

The optical waveguide may be planar, the method further including the step of providing a buffer layer having a refractive index $n_{buffer}$ on the opposite side of the core layer to the cladding layer, wherein:

$$n_{core} > n_{rods} \geq n_{buffer}.$$

Alternatively, the optical waveguide may be an optical fibre, the method further including the steps of:

providing the cladding layer surrounding the core layer.

According to a third aspect of the present invention, a method of guiding an optical signal comprises the step of passing an optical signal through a waveguiding region of an optical waveguide structure comprising a core layer having a first refractive index $n_{core}$, an array of sub-regions within the core layer having a second refractive index $n_{rods}$, the array of sub-regions giving rise to a photonic band structure experienced by an optical mode travelling through the waveguide structure, and a cladding layer adjacent the core layer having a refractive index $n_{cladding}$, wherein:

$$n_{core} > n_{rods} \geq n_{cladding}.$$

The optical waveguide structure may be a planar structure. In this case, the waveguide guide structure preferably further includes a buffer layer having a refractive index $n_{buffer}$, wherein the core layer is positioned between the buffer layer and the cladding layer and wherein:

$$n_{core} > n_{rods} \geq n_{buffer}.$$

Alternatively, the waveguide structure may be an optical fibre structure, wherein the cladding layer surrounds the core layer.

According to a fourth aspect of the present invention, an optical waveguide structure comprises a core layer having a first refractive index $n_{core}$, a 2-dimensional array of sub-regions within the core layer having a second refractive index $n_{rods}$, the array of sub-regions extending longitudinally along the waveguide and giving rise to a photonic band structure within the core layer, and a cladding layer adjacent to the core layer having a refractive index $n_{cladding}$, wherein:

$$n_{core} > n_{rods} \geq n_{cladding}.$$

The preferred features of the first aspect are all equally applicable to the fourth aspect of the present invention. Furthermore, preferably $n_{core} - n_{rods} > 0.1$.

According to a fifth aspect of the present invention, a method of manufacturing a optical waveguide structure comprises the steps of:

providing a core layer having a first refractive index $n_{core}$;

providing a cladding layer adjacent to the core layer having a refractive index $n_{cladding}$;

forming a 2-dimensional array of holes in the core layer extending longitudinally along the wave guide structure; and filling the holes with a material having a second refractive index $n_{rods}$, wherein:

$$n_{core} > n_{rods} \geq n_{cladding}.$$

The preferred features of the second aspect are all equally applicable to the fifth aspect of the present invention. Furthermore, preferably $n_{core} - n_{rods} > 0.1$.

According to a sixth aspect of the present invention, a method of guiding an optical signal comprises the step of passing an optical signal through a waveguiding region of an optical waveguide structure comprising a core layer having a first refractive index $n_{core}$, a 2-dimensional array of sub-regions within the core layer extending longitudinally along the waveguide having a second refractive index $n_{rods}$, the array of sub-regions giving rise to a photonic band structure within the core layer, and a cladding layer adjacent to the core layer having a third refractive index $n_{cladding}$, wherein:

$$n_{core} > n_{rods} \geq n_{cladding}.$$

The preferred features of the third aspect are all equally applicable to the sixth aspect of the present invention. Furthermore, preferably $n_{core} - n_{rods} > 0.1$.

BRIEF DESCRIPTION OF THE DRAWINGS

Examples of the present invention will now be described in detail with reference to the accompanying drawings, in which.

DETAILED DESCRIPTION

Photonic crystal waveguide structures are based on some perturbation in dielectric constant in the core of a planar waveguide structure. This has most commonly been performed by the etching of air rods into the core layer of the waveguide. As light propagates through the core it interacts with the dielectric constant modulation and, in some structures, in a manner analogous to electrons in a semiconductor, certain electromagnetic fields are forbidden to propagate in the core. The forbidden electromagnetic fields form a photonic bandgap. More detail on the nature of the band structure of photonic crystals of this sort can be found in WO98/53351 (BTG International Limited).

Figure 1:
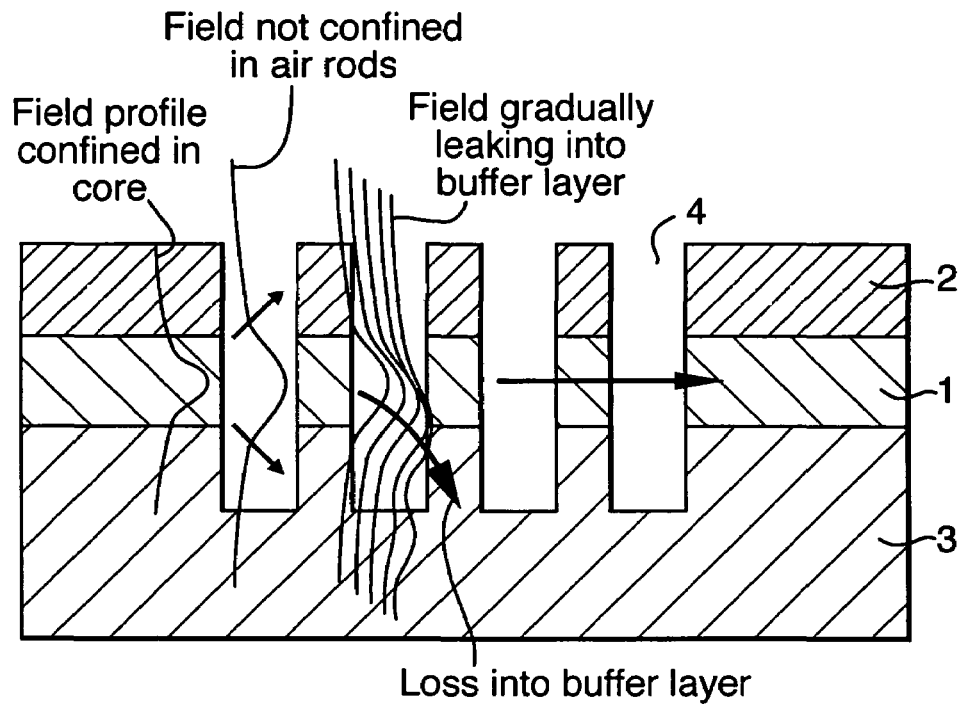
FIG. 1 is a schematic cross sectional view of a photonic crystal embedded in a waveguide structure in accordance with the prior art.

FIG. 1 illustrates the interaction of the electric field (E-field) of an optical mode with the core 1 in a photonic crystal according to the prior art. The light is travelling through the core 1 from left to right. A profile of the E-field within the core 1, cladding 2 and buffer 3 layers is shown. It can be seen that in the photonic crystal region the mode confinement is reduced and there is out of plane loss. When the light reaches the first air/core interface, the light diverges strongly in the vertical direction, introducing loss. Once the light is in the air region 4 there is no confinement and light escapes from the top of the structure and into the buffer layer 3, which is of a higher refractive index than air. Furthermore, owing to the fact that the structure is not symmetric, and light is not well confined in the vertical direction, light leaks into the buffer layer 3 from the air rods 4.

Vertical loss in the waveguide structure is very significant and limits the usefulness of the structure in practical devices, especially in confinement applications such as in waveguide bends.

Figure 2A:
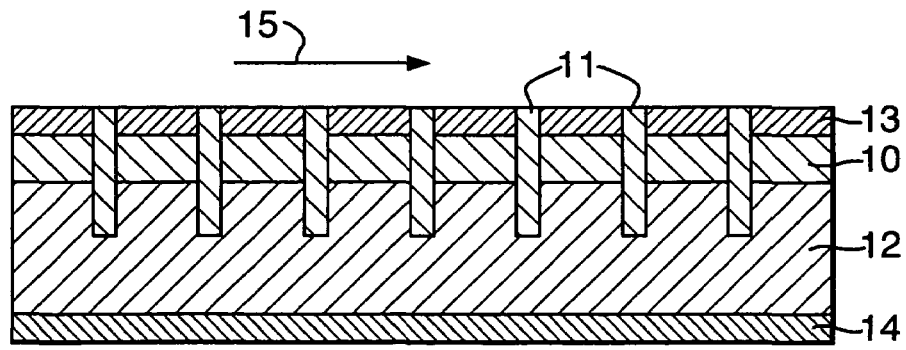
FIG. 2a is a schematic cross sectional view of a photonic crystal embedded in a waveguide structure in accordance with the present invention.

FIG. 2a shows a waveguide structure according to one aspect of the present invention. The waveguide structure shown in FIG. 2 comprises a core layer 10, having a refractive index $n_{core}$, an array of rods 11 in the core layer 10 having a refractive index $n_{rods}$, and buffer 12 and cladding layers 13 having a refractive index $n_{buffer}$ and $n_{cladding}$, respectively. In this example the rods 11 extend through the cladding layer 13 and partially into the buffer layer 12. However, alternatively, the rods may be formed solely in the core layer or solely in the core layer and cladding layer. The refractive indices satisfy the inequality:

$$n_{core} > n_{rods} \geq n_{cladding} \text{ and } n_{buffer}$$

This condition provides greater vertical confinement of the E-field of an optical signal passing through the waveguide. The higher refractive index of the rods 11 reduces the tendency of the light to leak into the buffer layer 12 and reduces losses from the top of the structure and into the substrate. The arrow 15 indicates the longitudinal direction of the waveguide from which it can be seen that the array extends longitudinally along the waveguide.

Figure 2B:
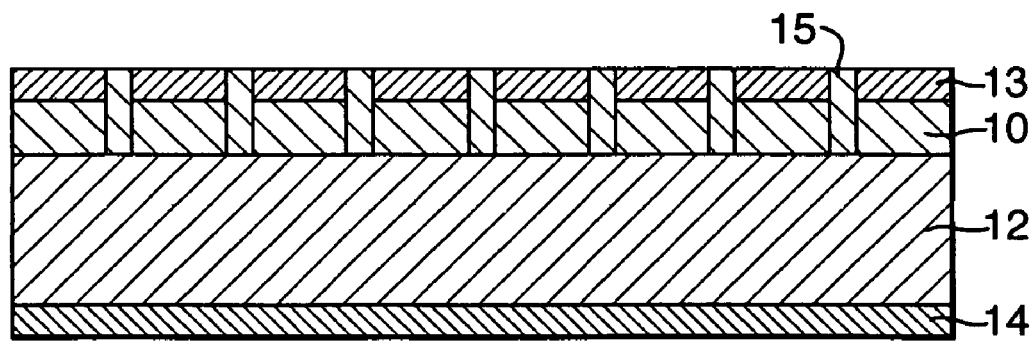
FIGS. 2b and 2c are schematic cross sectional views of other examples of photonic crystals embedded in a waveguide structure in accordance with the present invention.
Figure 2C:
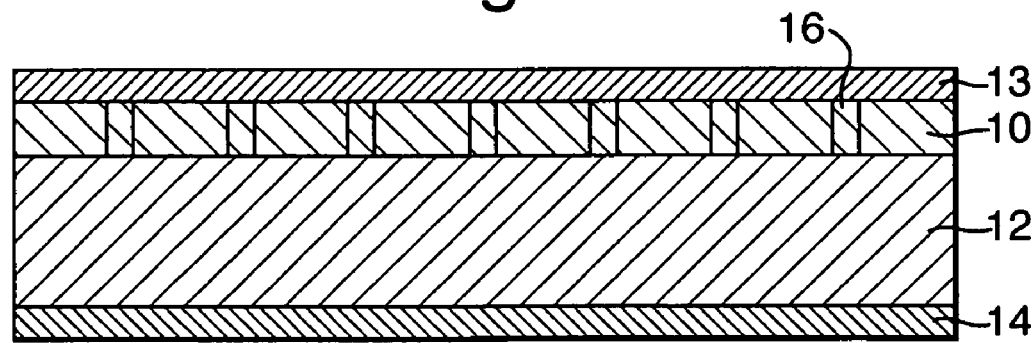

FIG. 2b shows an another example of a waveguide structure. The structure is identical to the structure shown in FIG. 2a in that it has substrate 14, buffer 12, core 10 and cladding 13 layers. The only difference is that the rods 15 extend through the cladding 13 and the core 10, but not into the buffer 12. Similarly, FIG. 2c shows a waveguide structure with substrate 14, buffer 12, core 10 and cladding 13 layers but in this example the rods 16 exist only in the core layer 10.

The core 10 material of the structure of FIG. 2a is a few microns in thickness and may be formed of silicon nitride (n=2.02). The rods 11 may be composed of silicon oxynitride (n=1.6). The cladding 13 and buffer 12 layers are formed of silicon dioxide (n=1.46). The buffer 12 and cladding 13 layers need not be formed of the same material as long as they satisfy the inequality above. The materials described above are examples only and it should be appreciated that other materials may be used. The benefit of the invention will be realised as long as the inequalities are satisfied. However, for structures which are easily coupled to typical optical fibres and devices it is preferred that the core layer has a refractive index between 1.4 and 4 and more preferably between 1.4 and 2.5, the rods have a refractive index between 1.3 and 1.6 and the cladding and buffer layers each have a refractive index between 1.3 and 1.6.

The waveguide of FIG. 2a also includes a substrate layer 14 underneath the buffer layer 12. The waveguide structure of FIG. 2a may be fabricated as follows. The buffer layer 12 is put on the substrate by thermal oxidation, HIPOX or plasma enhanced chemical vapour deposition (PECVD) depending on whether a thin or thick oxide is being deposited. The core layer is put down next by PECVD, CVD or sputtering. The cladding layer is then deposited by PECVD, CVD or sputtering. The position of the rods 11 is then defined, for example, by etching into the core 10. Wet or dry etching may be used but dry etching is preferred. The position of the rods may be either direct-written using an e-beam, or transferred from a mask. The material filling the rods, in this case silicon oxynitride, is then deposited into the etched holes using any suitable technique, such as PECVD, chemical vapour deposition (CVD), molecular beam epitaxy (MBE) or sputtering. Any silicon oxynitride on top of the waveguide can be removed preferably by dry etching, but alternatively by controlled wet etching or chemical mechanical polishing. Alternatively, the rods can be grown or etched from the substrate and a waveguide structure grown around the rods.

In the case described above both the filling material and the cladding are different materials. In order to simplify fabrication, the material filling the rods may be the same as the cladding. With a core of silicon nitride (n=2.02) and rods of silicon oxynitride (n=1.6), the silicon oxynitride (n=1.6) on top of the waveguide during fabrication can be retained. This provides a filling material which is identical to that of the cladding, which satisfies $n_{core} > n_{rods} = n_{cladding}$. Alternatively, rods can be grown or etched from the substrate and a waveguide structure grown around the rods.

Additionally, it is possible to include a different material to define the rods in the buffer and cladding layers, with a refractive index $n_{rods\ in\ cladding\ and\ buffer}$. In this instance the following inequality applies:

$$n_{core} > n_{rods\ in\ core} > n_{rods\ in\ cladding\ and\ buffer} > n_{cladding} \text{ and } n_{buffer}$$

Figure 3:
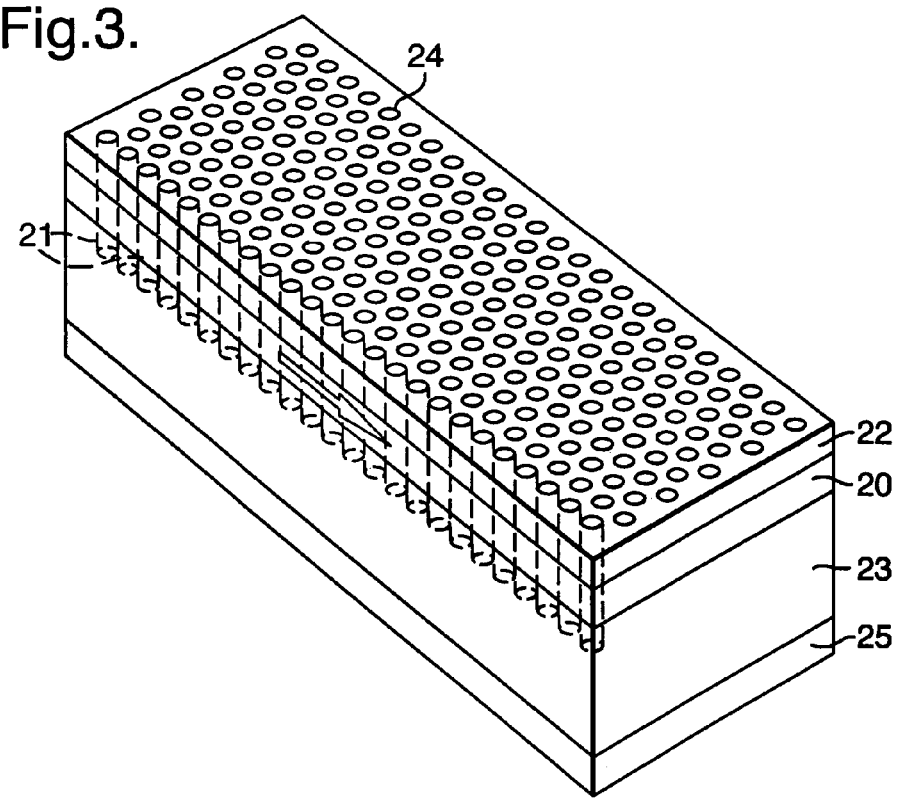
FIG. 3 shows a waveguide design in accordance with the present invention.

This type of structure improves transmittance but is more difficult to fabricate. The buffer layer 23 is deposited on a substrate 25, the rods are defined and etched partially into the buffer. A low index silicon oxynitride is deposited into the rods. The remaining silicon oxynitride is removed. The core layer 20 is deposited and the rods are defined and etched into the core. A slightly higher index silicon oxynitride is deposited into the rods 21 in the core 20 and the remaining silicon oxynitride is removed. The cladding layer 24 is then deposited and the rods are defined again. The rods are etched into the cladding and filled with a lower index silicon oxynitride. This results in the structure shown in FIG. 3. An example of refractive indices for this embodiment is $n_{core}=2.02$, $n_{rods\ in\ core}=1.6$, $n_{rods\ in\ cladding\ and\ buffer}=1.58$ and $n_{cladding}$ and $n_{buffer}=1.46$.

Figure 4:
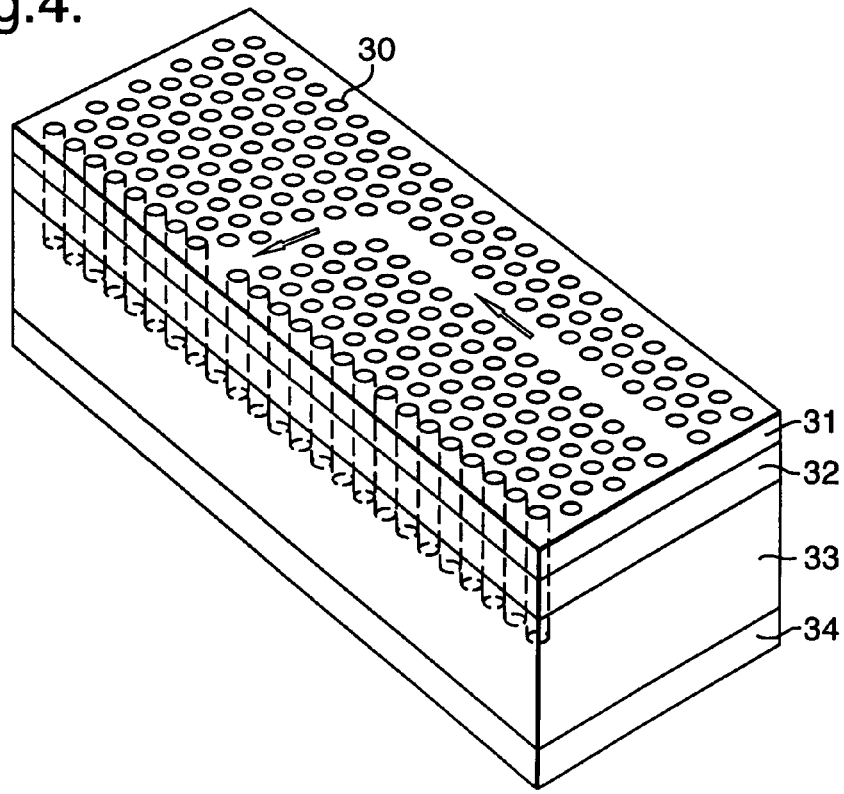
FIG. 4 shows a waveguide bend formed with a waveguide design in accordance with the present invention.

As shown in FIG. 4, waveguides in accordance with the present invention can include tight waveguide bends. The waveguide structure comprises an array of silicon oxynitride rods 30 extending through a cladding layer 31 and a core layer 32 and partially into a buffer layer 33, formed on a substrate 34. A number of rods are missing from the array forming a waveguide which includes a 90° bend. Clearly, the waveguide could take any shape and could, for example, include a bifurcation to form a splitter. The reduced vertical loss from the waveguide means that light within the bandgap of the photonic crystal region is confined with the waveguide and is forced to propagate around the bend. This allows integrated optical circuits to be fabricated over a much smaller area with greatly reduced loss (of the order of 10 dB) and optical devices incorporating waveguide bends to be made smaller. For example, waveguide bends in an arrayed waveguide grating (AWG) are typically of the order of a couple of millimetres. They can be reduced using the present invention to be of the order of a couple of microns, with minimal loss of light.

Figure 5:
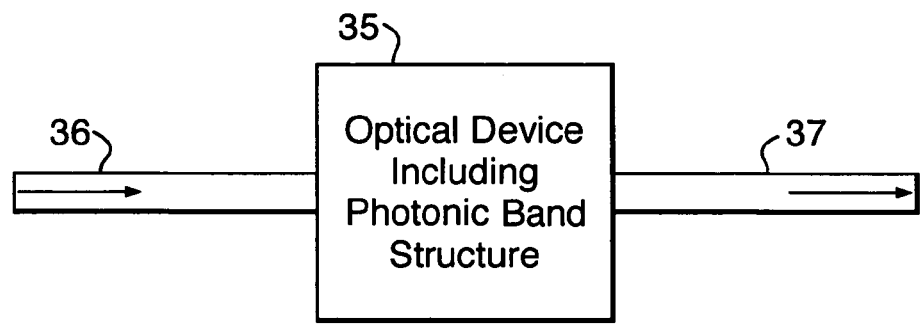
FIG. 5 is a schematic illustration of a optical device in accordance with the present invention.

Other devices may also be made incorporating a photonic band structure in an optical waveguide in accordance with the present invention, such multiplexers, demultiplexers and dispersion compensators. These devices are formed in the same manner as described in WO98/53351 (BTG International Limited) referenced above, but with materials chosen to satisfy $n_{core} > n_{rods} \geq n_{cladding}$. FIG. 5 is a schematic illustration of such an optical device 35, including an optical input 36 and an optical output 37. The device 35 typically includes a photonic band structure region in the optical path of an input optical signal which acts to process the signal in some way, such as dispersion compensating.

Figure 6:
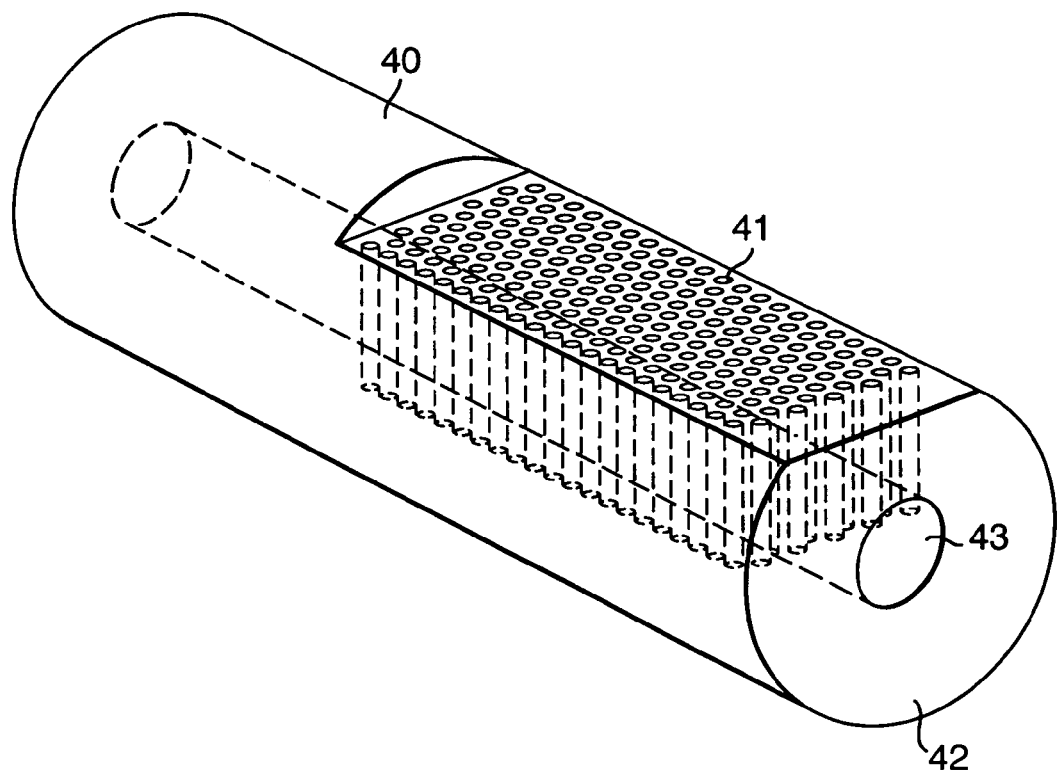
FIG. 6 shows an optical fibre incorporating a structure in accordance with present invention.

The present invention can be applied to any glass technology, whether it is planar or fibre. For example, as shown in FIG. 6, conventional fibre 40 could be flattened or planarised and an array of filled holes 41 incorporated into the flattened region through the cladding 42 and the core 43. The structure as a whole remains in-fibre.

The material forming the high index rods is not necessarily silicon oxynitride, it may for example be a non-linear material of suitable refractive index, providing the possibility of a tuneable device, for example a tuneable filter.

The present invention provides a waveguiding structure having a photonic band structure with lower loss than prior structures of the same type. This means that a larger number of rows of rods, equating to conventional holes, can be used in a device structure for the same amount of loss. High losses in prior structures has limited the effect of the band structure. With the present invention it is feasible to produce longer structures for the same loss, and hence longer time delays and higher resolution filters and demultiplexers.

Waveguiding structures according to the present invention may be used in photonic elements in many different applications. Photonic elements, including those of the present invention, may be implemented in telecommunications systems, in biosensor devices, and in optical storage media.

Figure 7:
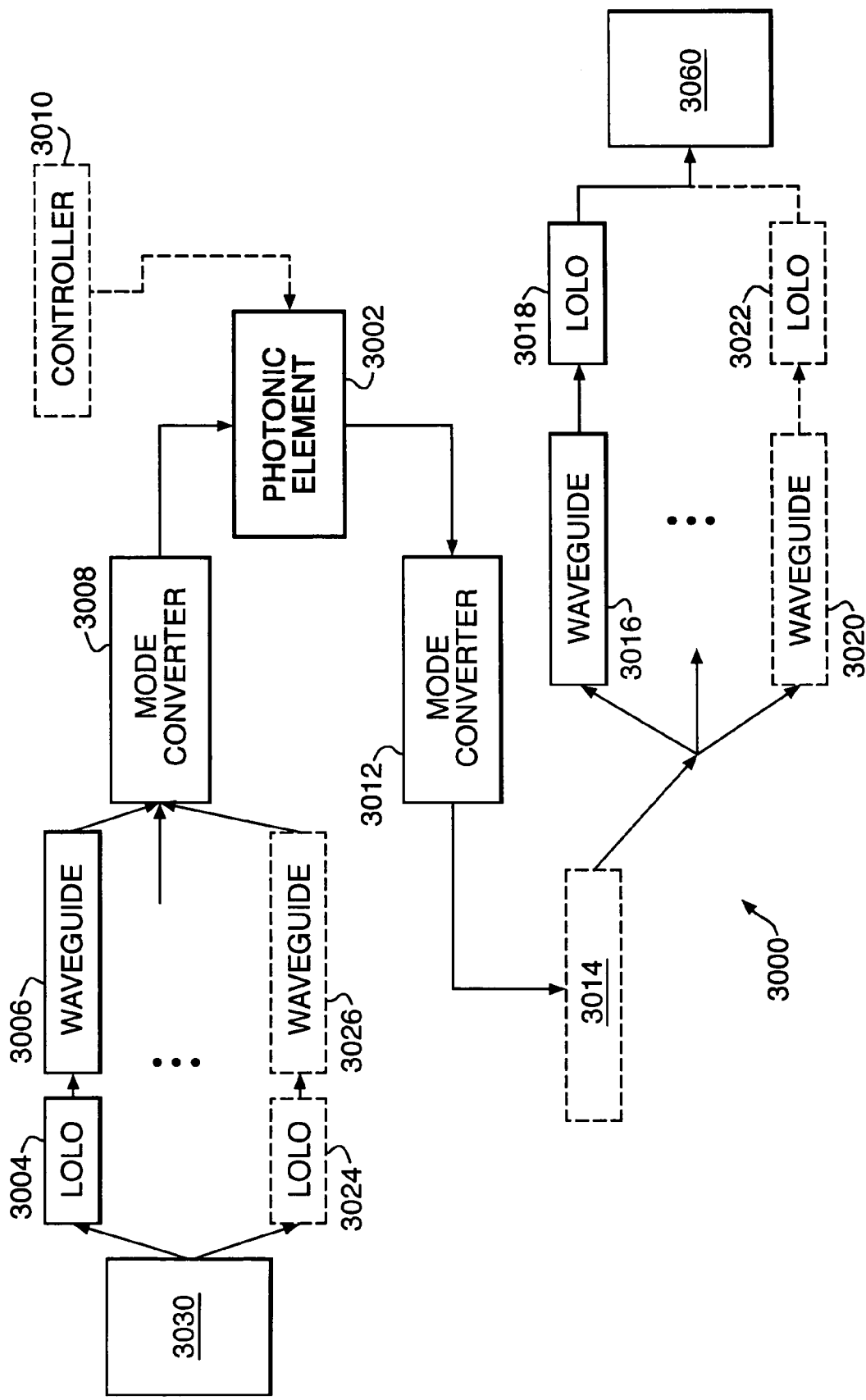
FIG. 7 shows schematically a photonic device incorporating a photonic element suitable for use in a telecommunications system.

FIG. 7 illustrates the general arrangement of a photonic device 3000 incorporating a photonic element 3002. The illustrated photonic device 3000 is suitable for use in a telecommunications system. A light signal typically propagates along a waveguiding structure 3050, such as an optical fibre. The photonic device 3000 includes: at least one Light On Light Off (LOLO) device 3004, 3024; at least one waveguide element 3006, 3026; a mode converter 3008; the photonic element 3002; a further mode converter 3012; at least one further waveguide element 3016, 3020; and at least one further LOLO device 3018, 3022.

The LOLO device 3004 couples the waveguiding structure 3050 to other components of the photonic device 3000, in the process converting the mode of the telecommunications waveguiding structure 3050 (which is typically large, approximately 8 mm in diameter) into a much smaller (approx. 1 to 2 mm in diameter) planar waveguide mode that can propagate along the photonic device 3002 with minimal loss. In many cases, several channels need simultaneous processing and multiple fibre inputs are provided.

Following the coupling of light from the external waveguiding structure 3050 to the photonic device 3002, horizontal confinement of the mode is commonly provided by at least one waveguide element 3006. Waveguide elements 3006 such as rib or ridge waveguides are often implemented in high refractive index contrast planar material systems. Other waveguide elements 3006 include waveguide splitters and bends. By means of these waveguide elements 3006 (defect state waveguides, ribs, ridges, splitters and/or bends), light from the LOLO device 3004 is transported from one region of the device to another.

The mode converter 3008 is required to provide efficient coupling of light from the waveguide into the photonic element 3002. Examples of wave converters include tapers, multi-mode interference slab couplers, and star couplers. Efficient coupling requires attention to appropriate propagation modes and angles in the photonic element 3002, in order to minimise reflections and loss from the interface of the element 3002. Following the conversion of the mode, the light is processed by, and propagates through, the photonic element 3002.

The operation of photonic element 3002 may be altered in a number of ways, including the application of an optical and/or an electrical control signal. The means for altering the operation of the photonic element 3002 is represented in the Figure as an (optional) controller element 3010. Examples of suitable controller elements 3010 include optical control signal sources, electrical control signal sources, and optical pumps, depending on the functionality of the photonic element.

The mode is converted back again into a mode for propagation along the waveguide by the further mode converter 3012. Optionally, additional photonic elements 3014 can be inserted to provide extra functionality and to increase the integration capabilities of the photonic device. The additional photonic elements 3014, when provided, may be associated with a corresponding variety of connecting optical components, including further waveguide devices and/or splitters. As the reader will appreciate, the connecting optical components may themselves be formed as integrated photonic elements as well as conventional waveguides joining the photonic elements. The optional, additional photonic element feature in the Figure represents the presence of at least one photonic element and the concomitant connecting optical components in order to provide a highly integrated optical device.

Finally, at least one further waveguide element 3016 (ribs, ridges, splitters and/or bends) is used to guide the light along to the further LOLO device 3018. In this arrangement, the light is coupled back out into an output waveguiding structure 3060. Multiple waveguide elements 3016, 3020 and LOLO devices 3018, 3022 can be used for applications such as demultiplexers.

It is further noted that the further waveguide elements 3016, 3020 and further LOLO devices 3018, 3022 may be one and the same as the LOLO devices 3004, 3024 and waveguide elements 3006, 3026.

Figure 8:
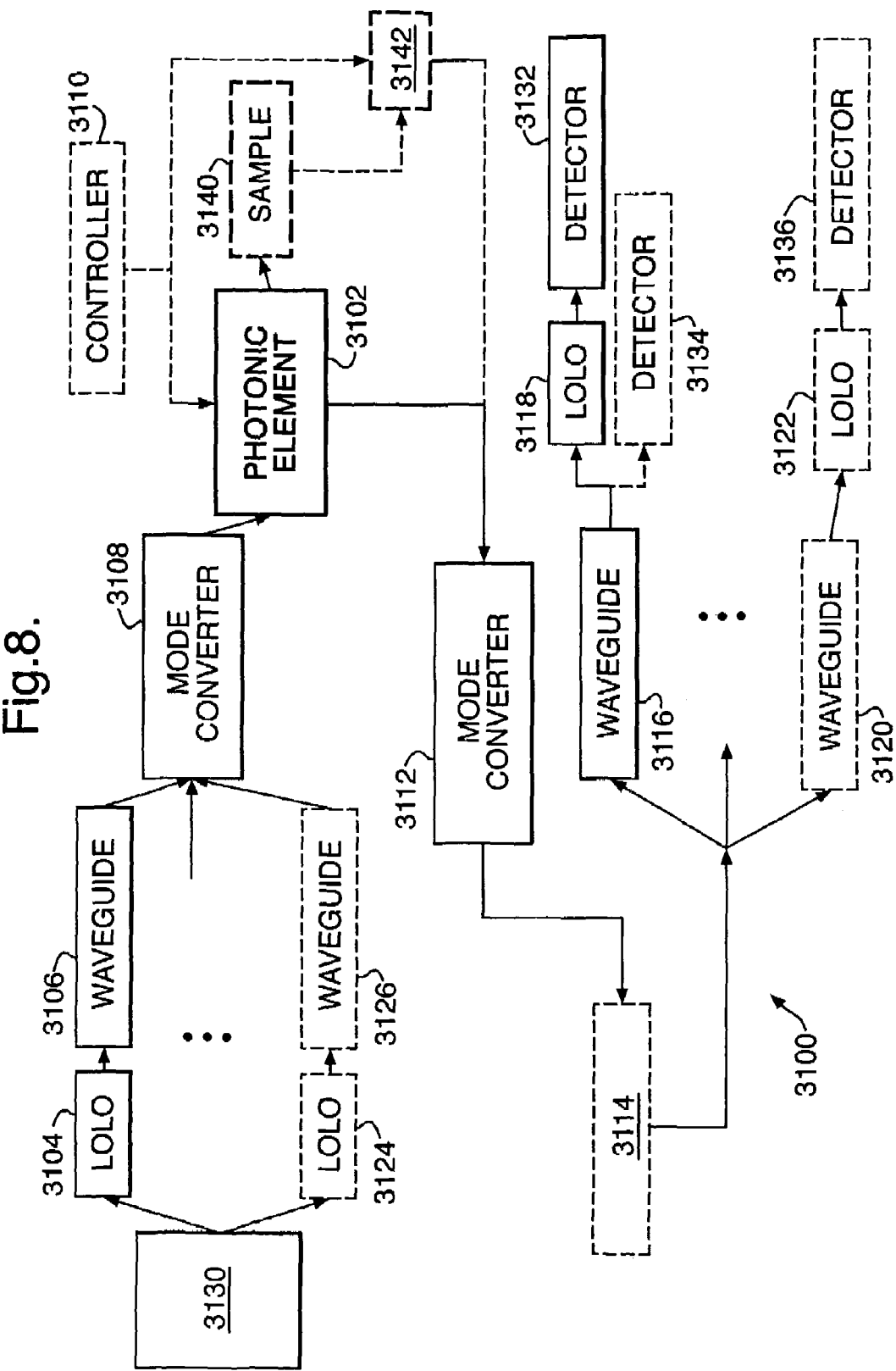
FIG. 8 shows schematically another photonic device incorporating a photonic element suitable for use in a biosensor arrangement; and, FIG. 9 shows schematically a further photonic device incorporating a photonic element suitable for use in an optical pick-up unit.

FIG. 8 illustrates the general arrangement of another photonic device 3100 incorporating a photonic element 3102. The illustrated photonic device 3100 is suitable for use in a biosensor arrangement.

The photonic device 3100 includes: at least one Light On Light Off (LOLO) device 3104, 3124; at least one waveguide element 3106, 3126; a mode converter 3108; the photonic element 3102; a further mode converter 3112; at least one further waveguide element 3116,3120; and at least one detector 3136,3134,3132.

Light from a light source 3130, for example a laser or a light emitting device (LED), is launched into the or each waveguide element 3106 via a corresponding LOLO device 3104. The launching of light could simply be end-facet coupling of the light into the waveguide 3106. Again, the waveguide element 3106, may include bends, splitters, ribs and/or ridge structured waveguides. The or each waveguide element 3106 is used to guide incoming light into different regions of the photonic device 3100 where illumination of different samples is performed.

The mode converter 3108 is required to provide efficient coupling of light from the waveguide into the photonic element 3102.

Preferably, the or each photonic element 3102 is itself provided with sample recesses for receiving at least one sample and illumination is performed inside the photonic element 3102. Alternatively, the photonic element 3102 is arranged to launch the light into at least one external biological sample 3140. In some examples of biosensor arrangements, the sample is assayed not as a result of direct illumination but rather through the observed interaction of the evanescent field of light propagating in the photonic element 3102.

Illumination of biological and/or biochemical samples can result in characteristic luminescence properties, for example fluorescence or phosphorescence. In the preferred arrangement, light emitted from the or each sample is then collected at another portion of the photonic element 3102: whereas, in the external sample arrangement, light emitted from the or each sample is collected at another photonic element 3142.

The operation of photonic element 3102, and where present the other photonic element 3142, may be altered in a number of ways, including the application of an optical and/or an electrical control signal. The means for altering the operation of the photonic element 3102,3142 is represented in the Figure as an (optional) controller element 3110. Examples of suitable controller elements 3110 include optical control signal sources, electrical control signal sources, and optical pumps.

Following the collection of the light, the mode is converted into a mode for propagation along the waveguide by the further mode converter 3112. Filtering and possible wavelength separation can then be performed using additional integrated photonic elements 3114.

The processed light signal is then routed around at least one further waveguide element 3116 (ribs, ridges, splitters and/or bends) is used to guide the light along to at least one integrated detector 3134. Processed light may alternatively be routed externally, a further LOLO device 3118,3122 providing the interface with an external detector 3132,3136. Many applications require the use of multiple detectors in order to span a range of different wavelengths, for example Raman Spectroscopy, or in order to distinguish between different samples.

FIG. 9 also illustrates the general arrangement of a photonic device 3200 incorporating a photonic element 3202. The illustrated photonic device 3200 is suitable for use in an optical pick-up unit, such as an optical disc reading head.

The photonic device 3200 includes: at least one Light On Light Off (LOLO) device 3204, 3224; at least one waveguide element 3206, 3226; a mode converter 3208; the photonic element 3202; a further mode converter 3212; at least one further waveguide element 3216,3220; and at least one integrated detector 3234,3238.

Light from a light source 3230, for instance a modulated laser or LED source, is launched into the photonic device 3200 by the LOLO element 3204. Although not illustrated, light can also be coupled into the photonic device 3200 from an external waveguiding structure, such as an optical fibre.

Light from the LOLO element 3204 is coupled into the waveguide element 3206. The waveguide element 3206, may include bends, splitters, ribs and/or ridge structured waveguides. The or each waveguide element 3206 is used to guide incoming light into different regions of the photonic device 3200.

A mode converter 3208 is required to provide efficient coupling of light from the waveguide element 3206 into the photonic element 3202. The photonic element 3202 processes the light, for example it may serve to filter, compensate for dispersion, focus, align or modulate the incoming light.

The operation of photonic element 3202, and where present the other photonic elements 3214,3244, may be altered in a number of ways, including the application of an optical and/or an electrical control signal. The means for altering the operation of the photonic element 3202,3214, 3244 is represented in the Figure as an (optional) controller element 3210. Examples of suitable controller elements 3210 include optical control signal sources, electrical control signal sources, and optical pumps.

The processed light output by the photonic element 3202 is converted into a mode for propagation along the waveguide by the further mode converter 3212. Filtering and possible wavelength separation can then be performed using additional integrated photonic elements 3214.

The light is propagated into a LOLO element 3246 where the light is focussed onto an optical storage medium 3240. The light is collected back again using another LOLO element 3248 where it is processed again with at least one further integrated photonic element 3244. The further integrated photonic element 3244 includes photonic "building block" elements, for example dispersion compensators, focussing elements, filters and amplifiers.

The processed light from further integrated photonic element 3244 is then coupled to at least one waveguide component 3216 (ribs, ridges, splitters and/or bends) and thereby projected onto a detector 3232,3234,3236,3238 which can either be in the plane of the waveguide or external to the waveguide (hence requiring a LOLO element 3218, 3222).

The invention claimed is:

1. An optical waveguide structure comprising:
a core layer having a first refractive index $n_{core}$,
an array of sub-regions within the core layer, said core layer sub-regions having a second refractive index $n_{rods}$, the array of sub-regions extending longitudinally along the waveguide and comprising a photonic band structure which is experienced by an optical mode travelling through the waveguide structure, and
a cladding layer adjacent to the core layer, said cladding layer having a refractive index $n_{cladding}$, wherein:
$n_{core} > n_{rods} \geq n_{cladding}$ and $n_{core} - n_{rods} > 0.1$, wherein said cladding layer includes a plurality of sub-regions, said cladding layer sub-regions are contiguous with said core layer sub-regions.

2. An optical waveguide structure according to claim 1, wherein the array of sub-regions gives rise to a photonic bandgap.

3. An optical waveguide structure according to claim 1, wherein the waveguide structure is a planar waveguide structure, the planar waveguide structure further comprising a buffer layer having a refractive index $n_{buffer}$, wherein the core layer is located between the buffer layer and the cladding layer and wherein:

$$n_{core1} > n_{rods} \geq n_{buffer}.$$

4. An optical waveguide structure according to claim 1, wherein the waveguide structure is an optical fibre structure, the cladding layer is an annular layer surrounding the core layer.

5. An optical waveguide structure according to claim 1, wherein the core layer has a refractive index between 1.4 and 4.

6. An optical waveguide structure according to claim 1, wherein the sub-regions have a refractive index between 1.3 and 1.6.

7. An optical waveguide structure according to claim 1, wherein the cladding layer has a refractive index between 1.3 and 1.6.

8. An optical waveguide structure according to claim 3, wherein the buffer layer has a refractive index between 1.3 and 1.6.

9. An optical waveguide structure according to claim 1, wherein the sub-regions are formed from silicon oxynitride or silicon dioxide.

10. An optical waveguide structure according to claim 1, wherein the core layer is formed from silicon nitride, doped silica, tantalum pentoxide or doped tantalum pentoxide.

11. An optical waveguide structure according to claim 1, wherein the cladding layer is formed from silicon dioxide.

12. An optical waveguide structure according to claim 3, wherein the buffer layer is formed from silicon dioxide.

13. An optical waveguide structure according to claim 1, wherein the cladding layer sub-regions extend through the cladding layer and the core layer sub-regions extend through the core layer.

14. An optical waveguide structure according to claim 3, further comprising a plurality of sub-regions in said buffer layer, wherein the buffer layer sub-regions are contiguous with said core layer sub-regions.

15. An optical waveguide structure according to claim 1, wherein the cladding layer sub-regions have a refractive index which is greater than the refractive index of the cladding layer but which is less than or equal to the refractive index of the core layer sub-regions.

16. An optical waveguide structure according to claim 1, wherein the core layer includes a lateral waveguiding region having no sub-regions.

17. An optical waveguide structure according to claim 16, wherein the waveguiding region includes a waveguide bend.

18. An optical device including an optical waveguide structure according to claim 1.

19. A method of manufacturing a optical waveguide structure comprising the steps of:
providing a core layer having a first refractive index $n_{core}$;
providing an array of sub-regions within the core layer, said sub-regions having a second refractive index $n_{rods}$, the array of sub-regions extending longitudinally along the waveguide and comprising a photonic band structure which is experienced by an optical mode travelling through the waveguide structure; and
providing a cladding layer adjacent to the core layer, said cladding layer having a refractive index $n_{cladding}$; wherein:

$n_{core} > n_{rods} \geq n_{cladding}$ and $n_{core} - n_{rods} > 0.1$, wherein said cladding layer includes a plurality of sub-regions, said cladding layer sub-regions are contiguous with said core layer sub-regions.

20. A method according to claim 19, wherein the optical waveguide is planar, the method further including the step of providing a buffer layer having a refractive index $n_{buffer}$ on the opposite side of the core layer to the cladding layer, wherein:

$$n_{core} > n_{rods} \geq n_{buffer}.$$

21. A method according to claim 19, wherein the optical waveguide is an optical fibre, the method further including the steps of: providing the cladding layer as an annular layer surrounding the core layer.

22. A method of guiding an optical signal comprising the step of passing an optical signal through a waveguiding region of an optical waveguide structure, said structure comprising:
a core layer having a first refractive index $n_{core}$,
an array of sub-regions within the core layer, said sub-regions having a second refractive index $n_{rods}$, the array of sub-regions extending longitudinally along the waveguide and comprising a photonic band structure which is experienced by an optical mode travelling through the waveguide structure, and
a cladding layer adjacent the core layer, said cladding layer having a refractive index $n_{cladding}$, wherein:
$n_{core} > n_{rods} \geq n_{cladding}$ and $n_{core} - n_{rods} > 0.1$, wherein said cladding layer includes a plurality of sub-regions, said cladding layer sub-regions are contiguous with said core layer sub-regions.

23. A method according to claim 22, wherein the optical waveguide structure is a planar structure, said planar waveguide structure further comprising a buffer layer having a refractive index $n_{buffer}$, wherein the core layer is located between the buffer layer and the cladding layer and wherein:

$$n_{core} > n_{rods} \geq n_{buffer}.$$

24. A method according to claim 22, wherein the waveguide structure is an optical fibre structure, wherein the cladding layer is an annular layer surrounding the core layer.

25. An optical waveguide structure comprising:
a core layer having a first refractive index $n_{core}$,
a 2-dimensional array of sub-regions within the core layer, said array of sub-regions having a second refractive index $n_{rods}$, the array of sub-regions extending longitudinally along the waveguide and comprising a photonic band structure within the core layer, and
a cladding layer adjacent the core layer, said cladding layer having a refractive index $n_{cladding}$ wherein:
$n_{core} > n_{rods} \geq n_{cladding}$, wherein said cladding layer includes a plurality of sub-regions, said cladding layer sub-regions are contiguous with said core layer sub-regions.

26. An optical waveguide structure according to claim 25, wherein $n_{core} - n_{rods} > 0.1$.

27. An optical waveguide structure according to claim 25, wherein the waveguide structure is a planar waveguide structure, further including a buffer layer, the core layer being formed between the cladding layer and said buffer layer, the buffer layer having a fourth refractive index $n_{buffer}$, wherein:

$$n_{core} > n_{rods} \geq n_{cladding} \text{ and } n_{buffer}.$$

28. An optical waveguide structure according to claim 25, wherein the waveguide structure is an optical fibre, and the cladding layer comprises an annular layer surrounding the core layer.

29. A method of manufacturing a optical waveguide structure comprising the steps of:
provetrait a core layer having a first refractive index $n_{core}$;
providing a cladding layer adjacent to the core layer, said cladding layer having a refractive index $n_{cladding}$;
forming a 2-dimensional array of holes in the core layer extending longitudinally along the waveguide structure;
filling the holes with a material having a second refractive index $n_{rods}$, wherein:
$n_{core} > n_{rods} \geq n_{cladding}$, said cladding layer includes a plurality of sub-regions, said cladding layer sub-regions are contiguous with said holes.

30. A method according to claim 29, wherein $n_{core} - n_{rods} > 0.1$.

31. A method according to claim 29, wherein the optical waveguide is a planar waveguide, the method further including the steps of:
providing a buffer layer having a refractive index $n_{buffer}$ on the other side of the core layer from the cladding layer; wherein:

$n_{core} > n_{rods} \geq n_{cladding}$ and $n_{buffer}$.

32. A method according to claim 29, wherein the optical waveguide is an optical fibre, the method including the step of:
providing the cladding layer surrounding the core layer.

33. A method of guiding an optical signal comprising the step of passing an optical signal through a waveguiding region of an optical waveguide structure, said wave guide structure comprising:
a core layer having a first refractive index $n_{core}$,
a 2-dimensional array of sub-regions within the core layer extending longitudinally along the waveguide having a second refractive index $n_{rods}$, the array of sub-regions comprising a photonic band structure within the core layer, and
a cladding layer adjacent to the core layer, said cladding layer having a refractive index $n_{cladding}$, wherein:
$n_{core} > n_{rods} \geq n_{cladding}$, said cladding layer includes a plurality of sub-regions, said cladding layer sub-regions are contiguous with said core layer sub-regions.

34. A method according to claim 33, wherein $n_{core} - n_{rods} > 0.1$.

35. A method according to claim 33, wherein the waveguide is a planar waveguide, further including a buffer layer, wherein the core layer is formed between the cladding layer and said buffer layer, the buffer layer having a fourth refractive index $n_{buffer}$, and wherein:

$n_{core} > n_{rods} \geq n_{cladding}$ and $n_{buffer}$.

36. A method according to claim 33, wherein the optical waveguide is an optical fibre, wherein the cladding layer is an annular layer surrounding the core layer.

* * * * *